US011238996B2

(12) United States Patent
Heibel et al.

(10) Patent No.: US 11,238,996 B2
(45) Date of Patent: Feb. 1, 2022

(54) REAL-TIME REACTOR COOLANT SYSTEM BORON CONCENTRATION MONITOR UTILIZING AN ULTRASONIC SPECTROSCPOPY SYSTEM

(71) Applicant: Westinghouse Electric Company LLC, Cranberry Township, PA (US)

(72) Inventors: Michael D. Heibel, Harrison City, PA (US); Jorge V. Carvajal, Irwin, PA (US); Nicola G. Arlia, Pittsburgh, PA (US); Melissa M. Walter, Butler, PA (US); Robert W. Flammang, Pittsburgh, PA (US); Michael A. James, Harmony, PA (US); David M. Sumego, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/840,498

(22) Filed: Apr. 6, 2020

(65) Prior Publication Data
US 2020/0335234 A1  Oct. 22, 2020

Related U.S. Application Data

(63) Continuation of application No. 15/066,607, filed on Mar. 10, 2016, now abandoned.

(51) Int. Cl.
*G21C 17/022* (2006.01)
*G21C 17/112* (2006.01)
(Continued)

(52) U.S. Cl.
CPC .......... *G21C 17/022* (2013.01); *G21C 17/112* (2013.01); *G01S 15/88* (2013.01); *G01S 15/8913* (2013.01)

(58) Field of Classification Search
CPC .. G21C 17/022; G21C 17/108; G21C 17/112; G01S 15/88; G01S 15/8913
See application file for complete search history.

(56) References Cited

U.S. PATENT DOCUMENTS 3,984,282 A * 10/1976 Kleimola ............... G21C 15/18
                                                                376/282
4,075,059 A *  2/1978 Bruno ....................... G21D 3/04
                                                                376/217
(Continued)

FOREIGN PATENT DOCUMENTS

JP    2009015132 A    1/2009
WO      9636970 A1   11/1996
WO   2017155645 A1    9/2017

OTHER PUBLICATIONS

Mohite-Patil, T. B., et al. "Modeling of Acoustic Wave Absorption in Ocean." International Journal of Computer Applications 9.12 (2010). (Year: 2010).*

(Continued)

*Primary Examiner* — Lily C Garner
(74) *Attorney, Agent, or Firm* — K&L Gates LLP

(57) ABSTRACT

A method and a system for performing real-time, continuous, measurements of the boron concentration in the water entering a nuclear reactor coolant system. The invention utilizes knowledge of the impact that boron contained in liquid water has on the attenuation of acoustic or ultrasonic waves. This information, coupled with radiation damage resistant and high temperature operability capable transmitter and receiver equipment, provides the means to place the measurement system sensors and signal processing electronics on the reactor coolant system charging flow piping or the hot leg or cold leg of the reactor coolant loop. This will allow the reactor operator to directly monitor both the reactor coolant system boron concentration value and detect (Continued)

changes in the reactor coolant system boron concentration relative to a reference value as they occur.

10 Claims, 3 Drawing Sheets

(51) Int. Cl.
*G01S 15/88* (2006.01)
*G01S 15/89* (2006.01)

(56) References Cited

U.S. PATENT DOCUMENTS

| | | | | |
|---|---|---|---|---|
| 4,582,672 A | * | 4/1986 | Tuley, Jr. | G21C 9/00 |
| | | | | 376/254 |
| 4,605,531 A | | 8/1986 | Leseur et al. | |
| 5,533,074 A | * | 7/1996 | Mansell | G01F 23/14 |
| | | | | 376/258 |
| 6,345,080 B1 | * | 2/2002 | Bauer | G21C 17/022 |
| | | | | 376/159 |
| 6,382,029 B1 | | 5/2002 | Shoureshi et al. | |
| 6,480,793 B1 | * | 11/2002 | Martin | G01F 1/704 |
| | | | | 702/100 |
| 6,944,254 B2 | * | 9/2005 | Kormuth | G21C 19/307 |
| | | | | 376/306 |
| 7,005,783 B2 | | 2/2006 | Hwu et al. | |
| 8,489,338 B2 | * | 7/2013 | Verneret | G21C 17/022 |
| | | | | 702/23 |
| 8,767,903 B2 | * | 7/2014 | Seidel | G21C 17/10 |
| | | | | 340/870.01 |
| 9,761,335 B2 | * | 9/2017 | Prible | G01N 23/005 |
| 2010/0260305 A1 | * | 10/2010 | Hyde | G21D 7/04 |
| | | | | 376/299 |
| 2013/0136222 A1 | * | 5/2013 | Nagai | G21C 7/00 |
| | | | | 376/210 |
| 2013/0148771 A1 | * | 6/2013 | Saguchi | G21C 1/09 |
| | | | | 376/217 |
| 2017/0263342 A1 | | 9/2017 | Heibel et al. | |

OTHER PUBLICATIONS

DOE Fundamentals: Reactor Theory—Nuclear Parameters. Relevant pages attached (p. 31 in particular). Uploaded to the web Mar. 2015. (Year: 2015).*
Partial Supplementary European Search Report for European Patent Application No. 17763706.3, dated Aug. 2, 2019.
DOE Fundamentals; Nuclear Physics and Reactor Theory; Reactor Theory (Nuclear Parameters). Relevant p. 31. Uploaded to the web Mar. 2015.
Mohite-Patil et al.. Modeling of Acoustic Wave Absorption in Ocean, International Journal of Computer Applications (Nov. 2010), 9:12, 19-24.
International Search Report and Written Opinion for International PCT Application No. PCT/US2017/016329 dated Apr. 28, 2017.

* cited by examiner

REAL-TIME REACTOR COOLANT SYSTEM BORON CONCENTRATION MONITOR UTILIZING AN ULTRASONIC SPECTROSCPOPY SYSTEM

CROSS-REFERENCE TO RELATED APPLICATIONS

This application is a continuation application claiming priority under 35 U.S.C. § 120 to U.S. patent application Ser. No. 15/066,607, filed Mar. 10, 2016 entitled REAL-TIME REACTOR COOLANT SYSTEM BORON CONCENTRATION MONITOR UTILIZING AN ULTRASONIC SPECTROSCOPY SYSTEM, the entire disclosure of which is hereby incorporated by reference herein.

BACKGROUND

1. Field

This invention relates in general to light water nuclear reactors and in particular to an instrumentation system for monitoring in real time the boron concentration within the reactor coolant.

2. Related Art

The primary side of nuclear reactor power generating systems which are cooled with water under pressure comprises a closed circuit which is isolated and in heat exchange relationship with the secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 (also shown in FIG. 2), enclosing a nuclear core 14. A liquid reactor coolant, such as water is pumped into the vessel 10 by pump 16 through the core 14 where heat energy is absorbed and is discharged to a heat exchanger 18, typically referred to as a steam generator in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20. At least one of those loops normally includes a pressurizer 19 connected to the reactor coolant loop piping 20 through a charging line 21.

An exemplary reactor design is shown in more detail in FIG. 2. In addition to the core 14 comprised of a plurality of parallel, vertical, co-extending fuel assemblies 22, for purposes of this description, the other vessel internal structure can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180 degrees in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as the lower support plate 37. The coolant flowing through the core 14 and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals 26, including a circular upper core plate 40. Coolant exiting core 14 flows along the underside of the upper core plate 40 and upwardly through a plurality of perforations 42. The coolant then flows upwardly and radially to one or more outlet nozzles 44.

The upper internals 26 can be supported from the vessel 10 or the vessel head 12 and include an upper support assembly 46. Loads are transmitted between the upper support assembly 46 and the upper core plate 40, primarily by a plurality of support columns 48. A support column is aligned above a selected fuel assembly 22 and perforations 42 in the upper core plates 40.

The rectilinearly movable control rods 28 typically include a drive rod 50 and a spider assembly 52 of neutron poison rods 28 that are guided through the upper internals 26 and into aligned fuel assemblies 22 by control rod guide tubes 54. The guide tubes are fixedly joined to the upper support assembly 46 and connected to the top of the upper core plate 40. By inserting and withdrawing the neutron poison rods into and out of guide thimbles within the fuel assemblies within the core the control rods regulate the extent of the nuclear reactions within the core. Boron, dissolved within the reactor coolant water, also functions to control the nuclear reactions and manages more gradual changes in reactivity than the control rods.

There is currently no direct method employed to continuously measure the boron concentration in the reactor coolant system. Current measurements rely on samples drawn from taps in the reactor coolant system that have piping running from inside the Reactor Containment Building to Chemistry Analysis Offices located in the Auxiliary Building. This methodology results in a significant time lag between the boron concentration measured in the sample drawn and the current reactor coolant system boron concentration during reactor coolant system boron concentration dilution and boration transient conditions. This necessitates monitoring for uncontrolled changes in reactor coolant system boron via changes in reactor reactivity using changes in reactor neutron flux levels. This approach is not typically capable of detecting core reactivity changes until significant reactivity changes have already occurred. This situation has resulted in many adverse "Reactivity Management" Operating Event incidents associated with inadvertent changes in reactor coolant system boron concentration resulting in uncontrolled core reactivity changes.

It is also necessary to monitor the reactor coolant system boron concentration to ensure that reactor Shutdown Margin is maintained when the reactor is shutdown. Boron concentration values are required during operation to ensure that the reactor is behaving in agreement with design expectations. Managing reactor coolant system boron concentration changes to compensate for fuel depletion during operation also requires detailed information on the value and changes in reactor coolant system boron concentration. Reactor coolant system boron dilution is required daily to compensate for fuel depletion. Ensuring that the desired reactor coolant system boron concentration change is occurring or has occurred is affected by the time lag caused by the current reactor coolant system boron concentration measurement process. Mistakes in the required amount of dilution required are only detected after they have already occurred.

The approach described in this specification is difficult to employ in the locations described above using conventionally available technology because of the radiation fields generated by the decay of N-16 produced from the oxygen in the water when it flows through or near the reactor core. The radiation field degrades the reliability of the electronics required to digitize and wirelessly transmit the sensor readings. The difficulty is also increased by the fact that temperature of the water flowing through the pipes exceeds the Curie point of typical piezoelectric materials used to produce and measure the ultrasonic radiation.

SUMMARY

This invention eliminates the foregoing concerns by using electronics, transmitters, and signal measurement devices that utilize vacuum micro-electronic device technology, allowing the critical features of these devices to be replaced by micro-scale vacuum tube technology having performance characteristics shown to be essentially impervious to radiation damage and very high temperatures. An application of the vacuum micro-electronic devices wireless transmitter technology is disclosed in U.S. Pat. No. 8,767,903, entitled "Wireless In-Core Neutron Monitor."

Thus, in accordance with a broad concept of this invention, a boron concentration monitor is provided for measuring, in real time, the boron concentration of coolant within the piping servicing a primary loop of a nuclear reactor. The boron concentration monitoring system comprises an acoustic transmitter acoustically coupled to or through the piping that is operable to transmit an acoustic signal substantially through an interior of the piping. An acoustic receiver is supported at a location around a circumference of the piping that is spaced from the acoustic transmitter, for receiving the acoustic signal from the transmitter. A communication mechanism is in electrical communication with the acoustic transmitter and the acoustic receiver and is configured to convey the transmitted acoustic signal and the received acoustic signal to a remote location. An analyzer is in communication with the remote location and is configured to receive the received acoustic signal and the transmitted acoustic signal from the communication mechanism and compare the received acoustic signal and the transmitted acoustic signal and from the comparison determine the boron concentration within the piping.

In one embodiment of the boron concentration monitor, the analyzer compares the signal comparison to a standard to determine the boron concentration in the piping. Preferably, the acoustic transmitter and acoustic receiver are at a known linear distance from each other and the standard is established from an experimental determination of the attenuation of an acoustic signal in a borated water solution over the known distance at a plurality of known boron concentrations.

In another embodiment, the communication mechanism comprises a wireless transmitter coupled to the acoustic transmitter and the acoustic receiver. The wireless transmitter is configured to wirelessly transmit both the transmitted acoustic signal and the received acoustic signal to the remote location. In the latter embodiment, the communications mechanism also comprises a wireless receiver configured to receive the wirelessly transmitted, transmitted acoustic signal and received acoustic signal at the remote location and communicate the transmitted acoustic signal and the received acoustic signal to the analyzer. In one configuration of the latter embodiment the acoustic transmitter, the acoustic receiver and the wireless transmitter are powered from a thermoelectric generator having a hot junction in thermal communication with the piping and a cold junction in thermal communication with a surrounding environment. In one arrangement of the latter embodiment the hot junction is in thermal communication with the piping through a heat pipe. Preferably, the wireless transmitter comprises two separate wireless transmitters respectively connected to the acoustic transmitter and the acoustic receiver.

In still another embodiment, the acoustic transmitter and the acoustic receiver are supported at substantially diametrically opposite positions around the circumference of the piping. Preferably, the acoustic transmitter and the acoustic receiver employ one or more vacuum micro-electronic devices and desirably those vacuum micro-electronic devices are vacuum micro-electronic devices. In such an arrangement, desirably, the transmitter employs one or more vacuum micro-electronic devices.

In another embodiment, the acoustic receiver is an ultrasonic energy measurement sensor. In each of the foregoing embodiments, the piping may be a charging line in fluid communication with the primary loop or a hot leg or a cold leg of the primary loop of the nuclear reactor. Each of the foregoing embodiments may further include a temperature sensor for determining the temperature of water flowing in the piping at the location of the acoustic transmitter and acoustic receiver that transmits a signal representative of the temperature through the communication mechanism to the analyzer which determines the boron concentration as a function of temperature. The boron concentration monitor may also include a pressure sensor for determining a pressure of the water flowing in the piping at the location of the acoustic transmitter and acoustic receiver that transmits a signal representative of the pressure of the coolant through the communication mechanism to the analyzer which determines the boron concentration as a function of temperature and pressure.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
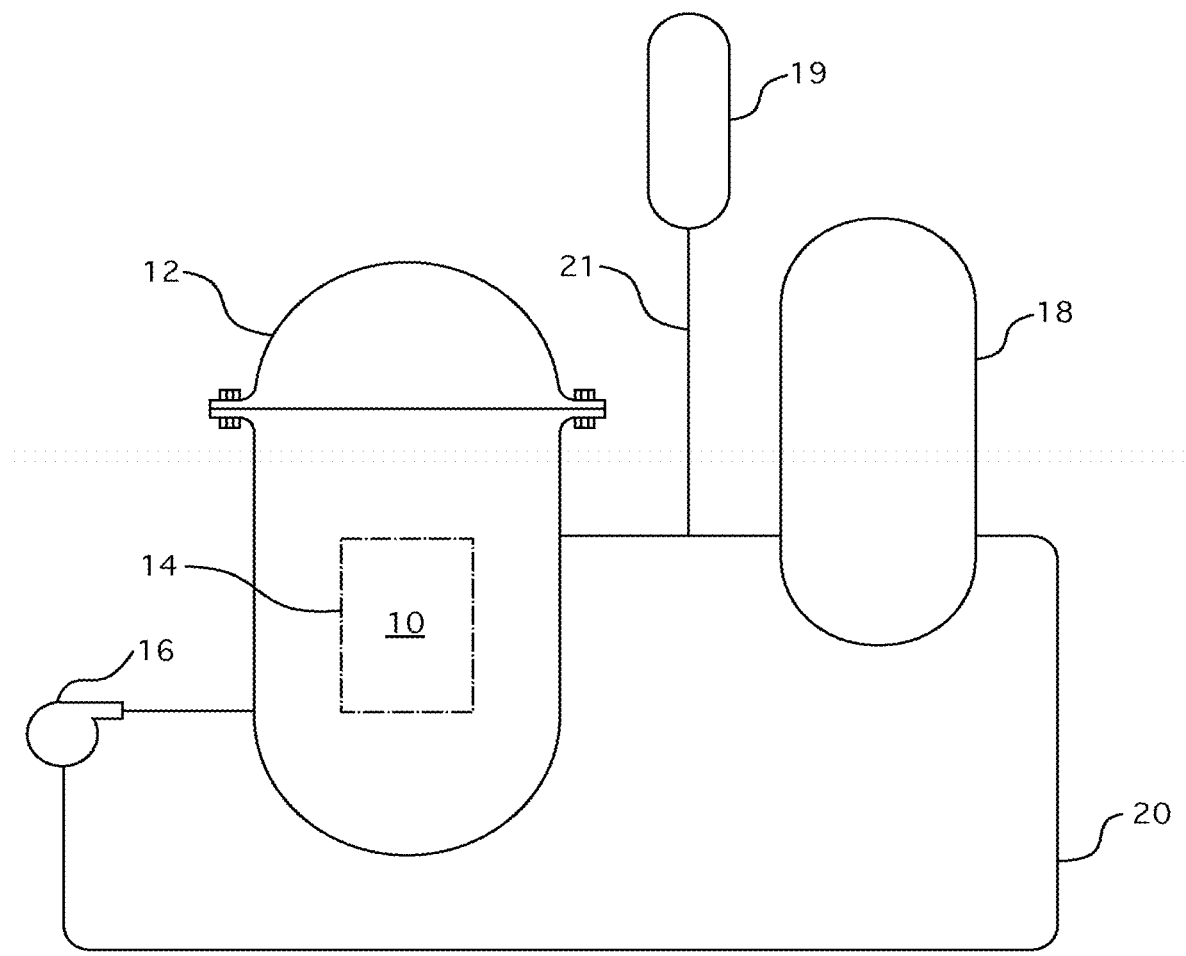
FIG. 1 is a simplified schematic of a nuclear reactor system to which this invention can be applied.
Figure 2:
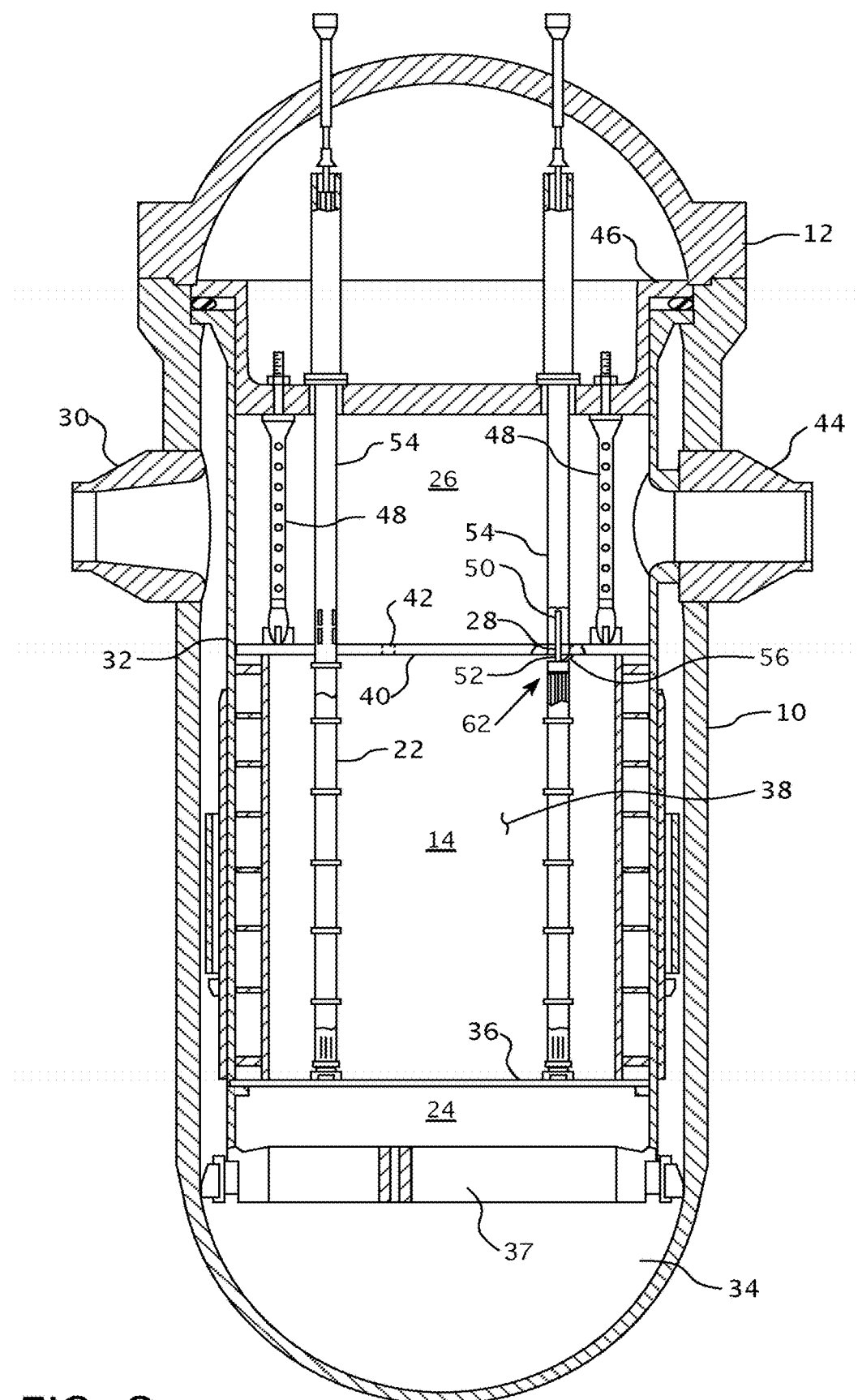
FIG. 2 is an elevational view, partially in section, of a nuclear reactor vessel and internals components to which this invention can be applied.
Figure 3:
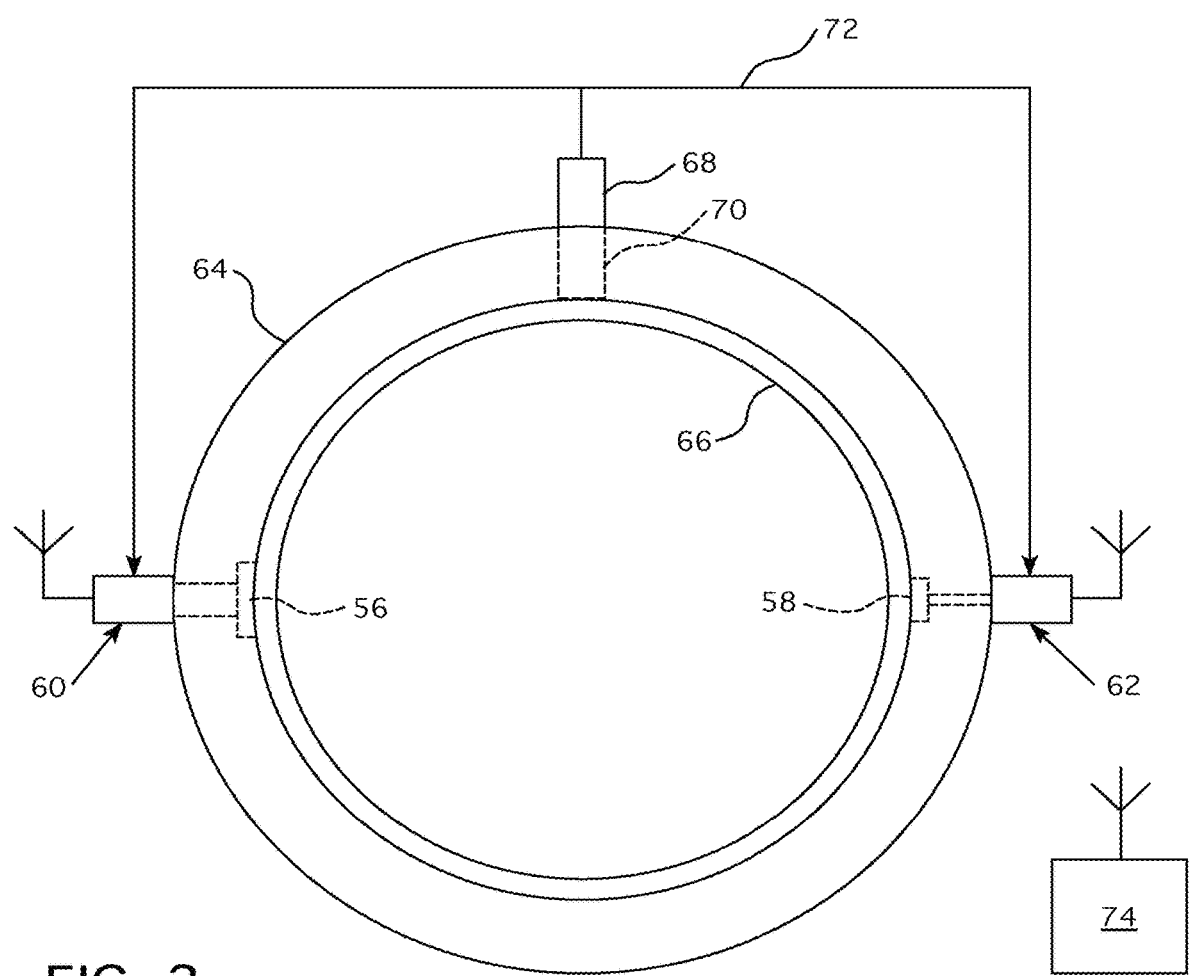
FIG. 3 is schematic of a cross-section of an exemplary reactor system piping with the devices of one embodiment of this invention shown in block form.

A preferred embodiment of this invention is illustrated in FIG. 3. The system comprises one or more pairs of ultrasonic transmitter 56 and ultrasonic energy measurement sensors or receivers 58 coupled with wireless transmitters 60, 62 that broadcasts a signal representing the intensity of the transmitted and received ultrasonic energy. The ultrasonic transmitter 56 and receiver 58 are coupled directly to the surface of the piping containing the fluid. The wireless signal transmitter 60, 62 is positioned on the insulation 64 surrounding the piping 66. The power 72 required by the ultrasonic transmitter 56 and the wireless signal transmitter 60, 62 is generated via one or more thermo-electric generators 68 that have the heated junction connected to a heat pipe 70 that penetrates the insulation 64 surrounding the piping 66 and a cold junction located on or above the outer surface of the insulation 64 on the piping 66. Alternatively, it should be appreciated that the hot junction of the thermoelectric generator 68 can be directly connected to the piping 66. The transmitted frequency used is selected to optimize the ability of the system to measure and detect changes in the boron concentration. An embodiment of this system can be used to track changes in bulk temperature corrected transmitted signal intensity and convert the changes in intensity to changes in boron concentration relative to a periodically manually updated reference established from current boron concentration titration measurements using existing methods.

The system can be installed on either the reactor coolant system hot or cold leg piping or the charging line providing flow into the reactor coolant system. An alternate embodiment would be the installation of the hardware on the pressurizer surge line piping 21. The preferred embodiment of the sensors, signal processing, and transmission electronics devices utilizes vacuum micro-electronic device based electronics and materials. Such devices, known as SSVDs, are commercially available from Innosys Inc., Salt Lake City, Utah. An example of such a device can be found in U.S. Pat. No. 7,005,783. An alternate embodiment would be to use less radiation and temperature tolerant materials and will require an increase in the required maintenance cycle. Another embodiment would allow the use of power and/or signal cables to provide transmitter power or receive transmitter and receiver output data. The measured signals are filtered to remove electronic noise in an analyzer 74 to meet user defined accuracy requirements using techniques well known to those skilled in the art.

An example of the parameters required to develop a correlation between the boron concentration in the reactor coolant system and the attenuation of the transmitted acoustic or ultrasonic energy is contained in an article entitled "Modeling of Acoustic Wave Absorption in Ocean" by T. B. Mohite-Patil, et al. *International Journal of Computer Applications*, November 2010:

$$am_1 = \frac{A_1 P_1 f_1 f^2}{f_1^2 + f^2}$$

$$A_1 = \frac{8.86}{c} \times 10^{(0.78\ pH - 5)}, \text{dB Km}^{-1}\text{KHz}^{-1}$$

$$A_1 = \frac{8.86}{c} \times 10^{(0.78\ pH - 45)}$$

$$P_1 = 1,$$

$$f_1 = 2.8(S/35)^{0.5} \times 10^{(4-1245/\theta)}, \text{KHz}$$

Where $c$ is the sound speed (m/s), given by $$c = 1412 + 3.21\ T + 1.19\ S + 0.0167\ D,$$

-continued $T$ is the temperature(° C.), $$\theta = 273 + T,$$

$S$ is the salinity(%), and $D$ is the depth ($m$).

The boron concentration in the liquid is obtained by solving the relationship for pH of the liquid and converting the pH information to boron concentration using the known properties of boron in an aqueous solution. Temperature and Pressure (Depth) information can be determined from existing sensors. Salinity (S) is determined based on known water properties. The frequency used is selected to optimize the ability to measure and detect changes in the boron concentration. Thus, the boron concentration can be determined by comparing the attenuation of the transmitted signal over a known travel path through the coolant with a standard obtained by transmitting a like acoustic signal over the known travel path through a plurality of different boron concentrations in water solutions with the concentrations determined by conventional chemical analysis. Alternatively, with the pressure and temperature of the coolant known a real-time reading of the boron concentration can be had from a computer mathematical analysis from the foregoing mathematical correlation.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A real-time method of monitoring a boron concentration of a coolant within a piping serving a primary loop of a nuclear reactor comprising:

transmitting an acoustic signal through the coolant within the piping;

receiving the transmitted acoustic signal after the transmitted acoustic signal has passed through at least a portion of the coolant within the piping, at a known distance between a transmitter structured to transmit the acoustic signal and a receiver configured to receive the transmitted acoustic signal;

comparing the received acoustic signal to the transmitted acoustic signal to determine an attenuation of the transmitted acoustic signal through the coolant within the piping; and determining the boron concentration of the coolant within the piping from the attenuation of the transmitted signal utilizing equation 1:

$$am_1 = \frac{A_1 P_1 f_1 f^2}{f_1^2 + f^2} \qquad \text{equation 1}$$

wherein $am_1$ is an absorption coefficient based on the attenuation of the transmitted acoustic signal;

$$A_1 = \frac{8.86}{c} \times 10^{(0.78pH - [[1]]5)}$$

c is a sound speed,
$P_1$ is a constant,
$f_1 = 2.8(S/35)^{0.5} \times 10^{(pH-1245/\theta)}$,
$\theta = 273+T$,
f is a frequency of the transmitted acoustic signal, and
pH is a calculated pH of the coolant, and
S is a salinity (%) of the coolant, and
T is a temperature (° C.) of the coolant, and
wherein the boron concentration of the coolant is determined based on converting the calculated pH of the coolant to the boron concentration of the coolant.

2. The method of claim 1, further comprising wirelessly transmitting the transmitted acoustic signal and the received acoustic signal to a remote location, wherein the comparing the received acoustic signal to the transmitted acoustic signal is performed at the remote location.

3. The method of claim 2, further comprising filtering the transmitted acoustic signal and the received acoustic signal at the remote location to remove electronic noise.

4. The method of claim 1, wherein the piping is a charging line in fluid communication with the primary loop.

5. The method of claim 1, wherein the piping is a hot leg or cold leg of the primary loop of the nuclear reactor.

6. The method of claim 1, wherein the acoustic transmitter is an ultrasonic transmitter.

7. The method of claim 1 wherein the converting the calculated pH of the coolant to the boron concentration of the coolant comprises comparing the attenuation with a standard obtained by chemically analyzing a plurality of different concentrations of boron in borated water solutions and measuring the attenuation over the known distance in each of the plurality of different concentrations of boron.

8. The method of claim 1 wherein the determining step comprises:
   obtaining the pressure and temperature of the coolant at a time of transmission of the acoustic signal; and
   using the attenuation, the temperature and the pressure to mathematically determine the boron concentration in real-time.

9. The method of claim 1, wherein $c = 1412 + 3.21*T + 1.19S + 0.0167D$, wherein T is a temperature of the coolant, S is a salinity (%) of the coolant, and D is a known depth (m).

10. The method of claim 9, wherein $P_1 = 1$.

* * * * *